(No Model.) 2 Sheets—Sheet 1.

A. BOCK.
RUNNING GEAR FOR VEHICLES.

No. 388,524. Patented Aug. 28, 1888.

WITNESSES:
W. R. Davis
C. Sedgwick

INVENTOR,
A. Bock.
BY
Munn & Co
ATTORNEY.

(No Model.) 2 Sheets—Sheet 2.
A. BOCK.
RUNNING GEAR FOR VEHICLES.
No. 388,524. Patented Aug. 28, 1888.
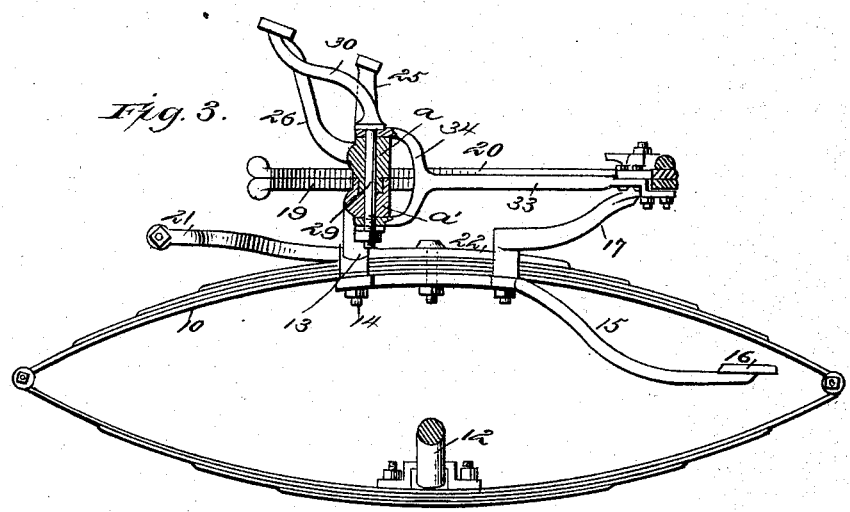
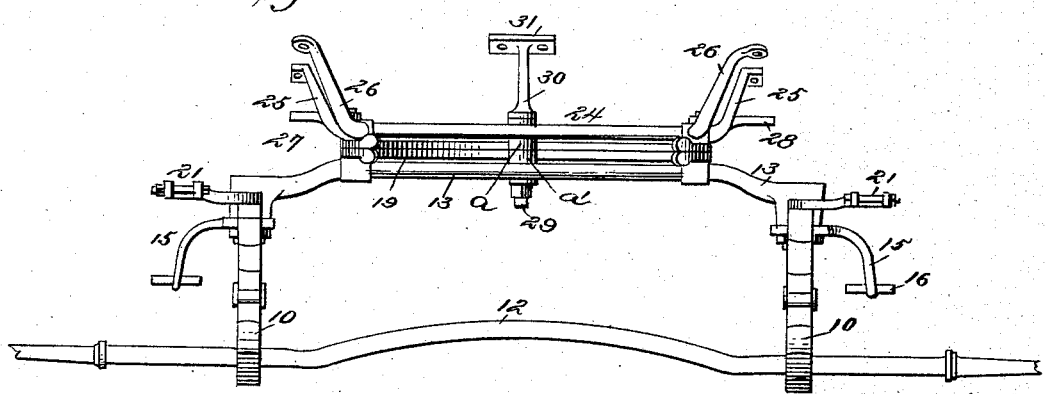
WITNESSES:
W. R. Davis.
C. Sedgwick.
INVENTOR.
A. Bock.
BY
Munn & Co.
ATTORNEY.

UNITED STATES PATENT OFFICE.

ADAM BOCK, OF MURFREESBOROUGH, TENNESSEE.

RUNNING-GEAR FOR VEHICLES.

SPECIFICATION forming part of Letters Patent No. 388,524, dated August 28, 1888.

Application filed May 31, 1888. Serial No. 275,613. (No model.)

*To all whom it may concern:*

Be it known that I, ADAM BOCK, of Murfreesborough, in the county of Rutherford and State of Tennessee, have invented a new and Improved Running-Gear for Vehicles, of which the following is a full, clear, and exact description.

My invention relates to an improvement in front-platform carriage-gear, and has for its object to simplify the construction of the same and provide a light, durable, and conveniently-applied device.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
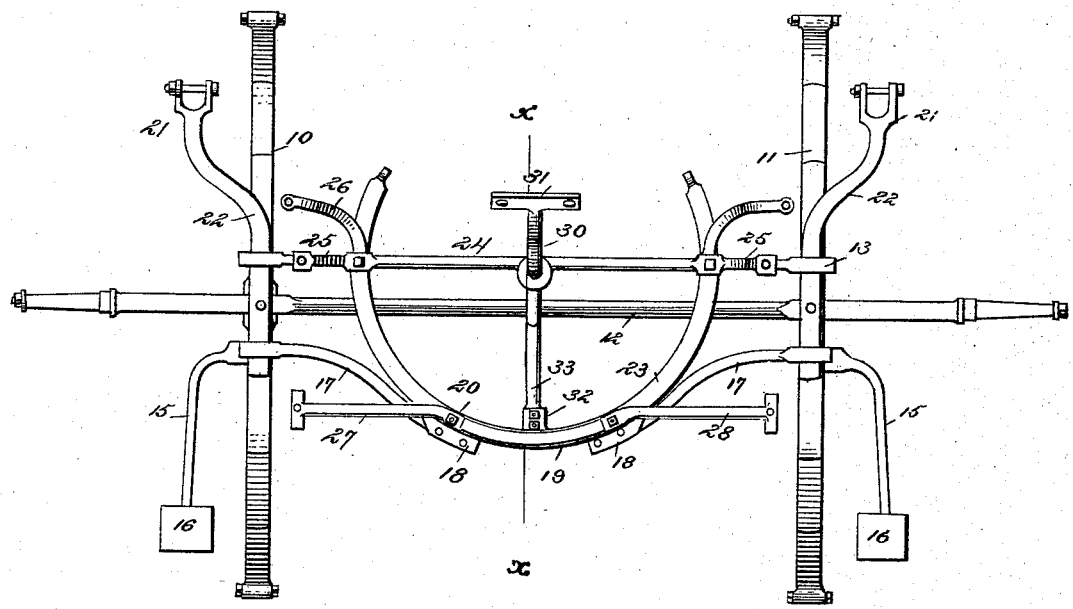
Figure 2:
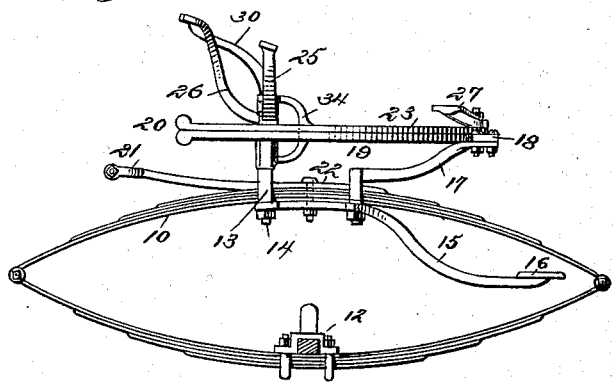

Figure 1 is a plan view. Fig. 2 is a side elevation, the axle being in section. Fig. 3 is a section on line $x$ $x$ of Fig. 1, and Fig. 4 is a rear elevation.

In carrying out the invention two elliptic springs, 10 and 11, are clipped or otherwise secured upon the axle 12, which springs are connected by a transverse bar, 13, engaging and attached to the upper surface forward of the center. The engagement of the bar and springs is effected by the bifurcated and threaded extremities 14 of the former spanning the latter. A curved bar, 15, carrying at its rear end a step, 16, is made to engage at its forward end the inner face of the top spring-section. The said forward extremity of the step-bar 15 is apertured to receive the threaded extremities of the cross-bar 13, and nuts are screwed upon said extremities of the cross-bar to a bearing against the step-bar, as best shown in Fig. 2. At the rear of the center of each spring, upon the top, a brace-bar, 17, is secured, the outer ends of which brace-bars are attached to projections 18, produced upon the outer surface of the lower section, 19, of a fifth-wheel, 20, as best shown in Fig. 1, whereby the rear end of the latter is supported, the forward end of the said fifth-wheel section being secured in any approved manner to the cross-bar 13. The brace-bars 17 are attached to the springs by the same means employed in securing the cross-bar 13.

The thill-irons 21 are held in position outside the springs by rod or bar 22, upon one end of which they are formed, and the said bar 22 is so curved as that the other end will come in contact with the springs between the same and the opposing face of the cross-bar 13 and rear brace-bar, 17, as best shown in Fig. 2. The said thill-bars are usually held in position by a bolt or bolts passing through them and through the springs.

The upper section, 23, of the fifth-wheel is provided with an attached short transverse or cross bar, 24, parallel with the main cross-bar 13, the ends whereof are bent upward and apertured to form the curved arms 25, adapted for attachment to the vehicle-body and auxiliary arms 26 are projected outward and upward from one side of the said short cross-bar at intersection of the same with the fifth-wheel for a similar purpose. Upon the upper surface of the fifth-wheel section two additional supporting-arms, 27 and 28, are secured, one at each side of the center at the rear, as best shown in Fig. 1, which arms project outward in opposite directions. The center portions of the two cross-bars are enlarged in vertical alignment, as shown at $a$ $a'$ in Fig. 3, to receive the king-bolt 29, and the upper end of the said king-bolt is curved upward to provide another body-sustaining arm, 30, said arm being preferably provided with a flattened and apertured head, 31, as best shown in Fig. 4.

An inwardly-projecting lug, 32, is projected from the upper fifth-wheel section about centrally the same, to which the rear stepped end of a horizontal guide-bar, 33, is secured, as best shown in Fig. 3, the forward end, 34, of which guide-bar is bifurcated and the same made to embrace the two cross-bars at the enlargements $a$ $a'$ and turn upon the king-bolt, as is also clearly illustrated in Fig. 3.

The iron used in the construction of the running-gear is preferably oval or circular in cross-section.

Having thus described my invention, what I claim as new, and desire to secure by Letters Patent, is—

1. The combination, with the axle, spaced elliptical springs clipped upon the same, a cross-bar uniting the springs, and thill-irons projected from said cross-bar, of a fifth-wheel having the lower section attached to the said cross-bar, a second short cross-bar secured to the upper section of the wheel, a king-pin passing through said cross-bars, and arms radiating from the upper cross-bar and the upper section of the wheel, substantially as shown and described.

2. The combination, with the axle, spaced elliptical springs clipped upon the same, a main cross-bar uniting the springs, and thill-irons projected from said cross-bar, of a fifth-wheel having the lower section attached to the said cross-bar, a second short cross-bar secured to the upper section of the wheel, a king-bolt passing through said cross-bars, a bifurcated guide-rod pivoted upon the king bolt and attached to the upper wheel-section, and arms radiating from the short cross-bar, the king-bolt, and wheels, substantially as and for the purpose specified.

3. The combination, with the axle, spaced elliptical springs clipped upon the same, a main cross-bar uniting the springs, thill-irons projected forwardly from said cross-bar, and step-carrying bars projected rearwardly therefrom, of a fifth-wheel having the lower section attached to said cross-bar, a second short cross-bar secured to the upper wheel-section, a king-bolt passing through said cross-bars, a bifurcated guide-arm pivoted upon the said king-bolt and attached to the upper wheel-section, braces connecting the wheel and springs, and supporting-arms radiating from the short cross-bar, the king-bolt, and wheel, substantially as shown and described.

ADAM BOCK.

Witnesses:
C. A. SHEAFE,
A. B. CANNON.